US010305671B2

(12) United States Patent
Kumar et al.

(10) Patent No.: US 10,305,671 B2
(45) Date of Patent: May 28, 2019

(54) SYNCHRONOUS DIFFERENTIAL SIGNALING PROTOCOL

(71) Applicant: Cirrus Logic International Semiconductor Ltd., Edinburgh (GB)

(72) Inventors: Bhoodev Kumar, Austin, TX (US); Muraleedharan Ramakrishnan, Austin, TX (US); Vivek Oppula, Austin, TX (US); Thomas Hoff, Austin, TX (US); Willem Zwart, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 40 days.

(21) Appl. No.: 15/159,760

(22) Filed: May 19, 2016

(65) Prior Publication Data

US 2016/0344536 A1 Nov. 24, 2016

Related U.S. Application Data

(60) Provisional application No. 62/164,872, filed on May 21, 2015.

(51) Int. Cl.
| | |
|---|---|
| *H04L 12/40* | (2006.01) |
| *H04L 7/00* | (2006.01) |
| *G06F 13/40* | (2006.01) |
| *G06F 13/42* | (2006.01) |

(52) U.S. Cl.
CPC ............ *H04L 7/0008* (2013.01); *G06F 13/40* (2013.01); *G06F 13/4291* (2013.01); *Y02D 10/14* (2018.01); *Y02D 10/151* (2018.01)

(58) Field of Classification Search
CPC ...... H04J 3/0682; H04J 3/0638; H04J 3/0608; H04L 1/0026; H04L 1/0003; H04L 7/042; H04L 7/10; H04L 7/027; H04L 7/06; H04L 7/0331; H04L 7/046; H04L 7/041; H04L 7/04; H04B 7/2048; H04N 13/139; H04W 28/06
USPC .................................................. 375/354–376
See application file for complete search history.

(56) References Cited

U.S. PATENT DOCUMENTS

| | | | | | |
|---|---|---|---|---|---|
| 4,715,031 | A | * | 12/1987 | Crawford ............ | H04L 12/4135 370/462 |
| 5,197,066 | A | * | 3/1993 | Sutterlin ........... | H04L 12/40032 370/445 |
| 5,491,531 | A | * | 2/1996 | Adams .............. | H04L 12/40013 370/431 |
| 6,058,149 | A | * | 5/2000 | Sato ..................... | H04J 3/0608 370/509 |

(Continued)

*Primary Examiner* — James M Perez
(74) *Attorney, Agent, or Firm* — Norton Rose Fulbright US LLP (57) ABSTRACT

Synchronous, differential signaling may be performed over a communications path through a wired connection between a master device and a slave device to provide high-bandwidth and/or low-latency communications. Flexibility may be provided in the signaling protocol by providing for a configurable frame structure. Flexibility may be provided in mapping of data streams to bit slots in a frame, varying a number of downlink and uplink slots, configuring a number of turnarounds and locations of the turnarounds within a frame, configuring location and number of control word bit (CWB) slots in a frame, and/or adjusting a clock frequency of the communications link.

36 Claims, 10 Drawing Sheets

(56) References Cited

U.S. PATENT DOCUMENTS

| | | | |
|---|---|---|---|
| 6,215,789 B1* | 4/2001 | Keenan | H04L 12/413 370/395.53 |
| 6,282,683 B1* | 8/2001 | Dapper | G06F 17/14 348/E7.07 |
| 6,804,315 B2* | 10/2004 | Demir | H04J 3/0608 375/362 |
| 6,891,881 B2* | 5/2005 | Trachewsky | H04L 1/0003 375/143 |
| 7,352,770 B1* | 4/2008 | Yonge, III | H04B 3/54 370/445 |
| 7,499,430 B2* | 3/2009 | Yun | H04B 7/2653 370/331 |
| 7,715,514 B2* | 5/2010 | Takeuchi | H03L 7/0814 327/160 |
| 7,734,000 B2* | 6/2010 | Kuo | H03L 7/087 375/360 |
| 7,804,926 B2* | 9/2010 | Sanduleanu | H03D 13/003 327/157 |
| 7,831,005 B2* | 11/2010 | Kuwata | H04L 7/0091 375/371 |
| 7,885,367 B2* | 2/2011 | Nishimura | H04L 7/048 327/144 |
| 7,940,921 B2* | 5/2011 | Bark | H04M 3/005 379/390.01 |
| 8,183,982 B2* | 5/2012 | Scherr | H04L 5/1484 340/10.3 |
| 8,391,436 B2* | 3/2013 | Higeta | H03K 5/1534 375/317 |
| 8,396,563 B2* | 3/2013 | Reinke | A61N 1/37288 607/2 |
| 8,774,199 B2* | 7/2014 | Black | H04L 12/4625 370/389 |
| 9,007,951 B2* | 4/2015 | Reidl | H04L 25/4904 370/229 |
| 9,148,722 B2* | 9/2015 | Howlett | H04R 3/00 |
| 9,378,176 B2* | 6/2016 | Hatfield | G06F 13/4291 |
| 9,503,250 B2* | 11/2016 | Van Rens | H04L 7/02 |
| 9,516,443 B2* | 12/2016 | Risberg | H04R 3/002 |
| 9,680,579 B2* | 6/2017 | Quiet | H04B 1/38 |
| 9,680,635 B2* | 6/2017 | Hainz | H04L 7/0332 |
| 9,836,274 B2* | 12/2017 | Zwart | G06F 3/165 |
| 9,853,804 B2* | 12/2017 | Zwart | H04L 7/0008 |
| 9,875,197 B2* | 1/2018 | Zwart | G06F 13/4282 |
| 9,900,143 B2* | 2/2018 | Zwart | H04L 5/16 |
| 9,935,786 B2* | 4/2018 | Zwart | G06F 13/4291 |
| 10,027,514 B2* | 7/2018 | Zwart | H04L 5/16 |
| 10,042,796 B2* | 8/2018 | Zwart | G06F 13/385 |
| 2004/0122490 A1* | 6/2004 | Reinke | A61N 1/025 607/60 |
| 2005/0058149 A1* | 3/2005 | Howe | H04L 47/10 370/428 |
| 2006/0092205 A1* | 5/2006 | Jackson Pulver | B41J 2/04505 347/13 |
| 2007/0170909 A1* | 7/2007 | Vorenkamp | G06F 1/266 324/76.11 |
| 2012/0128057 A1* | 5/2012 | Daecke | H04J 3/0638 375/239 |
| 2013/0142138 A1* | 6/2013 | Dinan | H04W 72/04 370/329 |
| 2013/0322462 A1* | 12/2013 | Poulsen | H04J 3/06 370/458 |
| 2014/0025999 A1 | 1/2014 | Kessler | |
| 2014/0101351 A1 | 4/2014 | Hooper et al. | |
| 2014/0336623 A1* | 11/2014 | Van Rens | H04L 7/02 604/528 |
| 2015/0229469 A1* | 8/2015 | Hainz | H04L 7/0332 375/225 |
| 2016/0154622 A1* | 6/2016 | Zwart | G06F 3/165 700/94 |
| 2016/0267028 A1* | 9/2016 | Zwart | G06F 13/4282 |
| 2016/0269193 A1* | 9/2016 | Zwart | G06F 13/4291 |
| 2016/0269201 A1* | 9/2016 | Zwart | H04L 5/16 |
| 2016/0306445 A1* | 10/2016 | Fleck | G06F 3/0383 |
| 2016/0319367 A1* | 11/2016 | Bernards | C12Q 1/6886 |
| 2016/0335211 A1* | 11/2016 | Zwart | G06F 13/385 |
| 2016/0337113 A1* | 11/2016 | Zwart | H04L 5/16 |
| 2016/0344536 A1* | 11/2016 | Kumar | H04L 7/0008 |
| 2017/0019244 A1* | 1/2017 | Zwart | H04L 7/0008 |
| 2018/0067715 A1* | 3/2018 | Zwart | G06F 3/165 |
| 2018/0102894 A1* | 4/2018 | Zwart | H04L 7/0008 |
| 2018/0176034 A1* | 6/2018 | Zwart | G06F 13/4291 |
| 2018/0307555 A1* | 10/2018 | Zwart | H04L 1/0045 |
| 2018/0309564 A1* | 10/2018 | Zwart | H04L 7/0008 |

* cited by examiner

| | 0 | 1 | | 15 | | | 31 | | | 47 | | |
|---|---|---|---|---|---|---|---|---|---|---|---|---|
| FRAME 1 | SYNC1 | SYNC0 | 1010_1010_1010 | CWB | TA_M | 100_1011_0010_1100 | TAS | CWB | 10_1010_10101_0101 | 0 | TA_M | 100_1011_0010_1100 | TAS |
| FRAME 2 | SYNC1 | SYNC0 | 0000_0000_0000 | CWB | TA_M | 000_0000_0000_0000 | TAS | CWB | 00_0000_00000_0000 | 0 | TA_M | 000_0000_0000_0000 | TAS |
| FRAME 3 | SYNC1 | SYNC0 | 0000_0000_0000 | CWB | TA_M | 000_0000_0000_0000 | TAS | CWB | 00_0000_00000_0000 | 0 | TA_M | 000_0000_0000_0000 | TAS |
| FRAME 4 | SYNC1 | SYNC0 | 0000_0000_0000 | CWB | TA_M | 000_0000_0000_0000 | TAS | CWB | 00_0000_00000_0000 | 0 | TA_M | 000_0000_0000_0000 | TAS |
| ⋯ | | | | | | | | | | | | |
| FRAME 32 | SYNC1 | SYNC0 | 0000_0000_0000 | CWB | TA_M | 000_0000_0000_0000 | TAS | CWB | 00_0000_00000_0000 | 0 | TA_M | 000_0000_0000_0000 | TAS |

902 spans SYNC/CWB regions; 904 spans TA_M/TAS regions.

FIG. 9

SYNCHRONOUS DIFFERENTIAL SIGNALING PROTOCOL

FIELD OF THE DISCLOSURE

This application claims the benefit of priority of U.S. Provisional Patent Application No. 62/164,872 to Oppula et al. filed on May 21, 2015 and entitled "Low Latency High Efficiency Differential Signaling Protocol," which is incorporated by reference herein.

FIELD OF THE DISCLOSURE

The instant disclosure relates to communications protocols. More specifically, portions of this disclosure relate to a protocol for synchronous signaling over a differential communications path.

BACKGROUND

Communications over wires and other communications channels tend to be higher latency than signaling over connections, wires, and busses in an integrated circuit (IC) or on a circuit board. Latency introduced by these communications channels, even if only hundreds of microseconds, can significantly degrade certain applications that require high bandwidth for data or that require real-time processing of data. For example, processing of high definition (HD) audio requires large amounts of bandwidth, particularly when being processed in raw, uncompressed formats. As another example, processing of data for adaptive noise cancellation (ANC) requires access to audio data in real-time in order to be able to cancel environmental sounds. That is, an audio processor needs near real-time availability of audio data from a coupled microphone to allow the audio processor to be able to generate cancellation signals for removing extraneous environmental noise. Even conventional communications paths for wired connections can be insufficient for providing this low latency data transfer that may need to be as small or smaller than one microsecond.

Shortcomings mentioned here are only representative and are included simply to highlight that a need exists for improved electrical components, particularly for communications systems employed in consumer-level devices, such as mobile phones, personal computers, and other consumer devices. Embodiments described herein address certain shortcomings but not necessarily each and every one described here or known in the art.

SUMMARY

Synchronous, differential signaling may be performed over a communications path through a wired connection between a master device and a slave device to provide high-bandwidth and/or low-latency communications. The synchronous, differential signaling may be performed according to a communications protocol, such as the protocols described herein. Embodiments of the synchronous, differential signaling and protocol may be beneficial in low-power environments, such as consumer audio applications. The signaling protocol may include a number of features including flexible mapping of data to bit slots, high efficiency, low latency, low power modes, tunneling control port transactions without interrupting an audio stream, burst configuration for fast bring-up, robust auto-link-lock mechanism, propagation of interrupts through the communications link regardless of mode of operation of the communications link, and/or propagation of resets through the link regardless of mode of operation of the communications link.

Flexibility may be provided in the signaling protocol by providing for a configurable frame structure. In some embodiments, flexible mapping may be provided for mapping of data streams to bit slots in a frame. In some embodiments, flexible mapping may be provided by varying a number of downlink and uplink slots, configuring a number of turnarounds and locations of the turnarounds within a frame, configuring location and number of control word bit (CWB) slots in a frame, and/or adjusting a clock frequency of the communications link.

The synchronous nature of the communications may allow a reduction in clock circuitry in the system of the master device and slave device. For example, clock recovery circuitry may be included only in the slave device. The slave device may recover the clock signal by detecting synchronization bits in the frames transmitted over the communications link by the master device.

Communications over a synchronous, differential communication path in accordance with protocols described in embodiments herein may provide a high efficiency communications link with high bandwidth and low latency. The synchronous nature of the protocol may reduce or eliminate the need to send clock reference bit slots in both directions, thus reducing overhead in the communications. Further, variable length downlink and uplink slots may be achieved by configuring a number of turnarounds and location of the turnarounds in a frame. In an example configuration, an efficiency may reach or exceed 90% when the link operates at 24.576 megahertz.

According to one embodiment, a method of communicating between a first device (e.g., a slave device) and a second device (e.g., a master device) by communicating, by the first device with the second device, synchronously over a differential line to transmit data in a frame, wherein the first device and the second device communicate synchronously using the same clock signal.

In some embodiments of the method, the method may also include recovering, by the first device, a clock signal of the second device; receiving, by the first device from the second device, synchronizing bits for detecting the clock signal of the second device; transmitting, by the first device, a predetermined pattern to the second device; and receiving, by the first device, a predetermined acknowledgment pattern to complete initialization of the connection; transmitting a link-lock pattern by one or both of the first device and the second device in response to the predetermined acknowledgement pattern; adjusting allocation of downlink slots and uplink slots within the frame; adjusting a number of turnarounds within the frame; adjusting allocation comprises adjusting a location of turnarounds within the frame; adjusting a position of control bits within the frame; adjusting a frequency of the clock signal; receiving, within the frame, a command, wherein the command determines an organization of data within the frame; receiving a command indicating a burst configuration for the frame, wherein the burst configuration configures the frame for writing control data when digital data is not present; receiving, within control word bits of the frame, an interrupt bit indicating a received interrupt; and/or detecting, by the first device, a reset command from the second device by detecting a predefined potential on the differential line.

According to another embodiment, an apparatus may include a first device configured to communicate synchronously with a second device over a differential communications path by transmitting data in a frame, wherein the first device and the second device communicate using the same clock signal.

In some embodiments of the apparatus, the apparatus may be configured to perform any of the steps of recovering, by the first device, a clock signal of the second device; receiving, by the first device from the second device, synchronizing bits for detecting the clock signal of the second device; transmitting, by the first device, a predetermined pattern to the second device; and receiving, by the first device, a predetermined acknowledgment pattern to complete initialization of the connection; adjusting allocation of downlink slots and uplink slots within the frame; adjusting a number of turnarounds within the frame; adjusting allocation comprises adjusting a location of turnarounds within the frame; adjusting a position of control bits within the frame; adjusting a frequency of the clock signal; receiving, within the frame, a command, wherein the command determines an organization of data within the frame; receiving a command indicating a burst configuration for the frame, wherein the burst configuration configures the frame for writing control data when digital data is not present; receiving, within control word bits of the frame, an interrupt bit indicating a received interrupt; and/or detecting, by the first device, a reset command from the second device by detecting a predefined potential on the differential line.

According to another embodiment, a system may include a master device, a slave device, and a communications path between the master device and the slave device, wherein the master device and the slave device are configured to communicate using frames transmitted in synchronous, differential signals over the communications path.

In certain embodiments of the system, the slave device may be configured to recover a clock signal of the master device; the master device may be configured to transmit synchronizing bits for initializing communications over the communications path; the slave device may be configured to recover the clock signal based, at least in part, on the synchronizing bits; the slave device may be configured to transmit a predetermined pattern to the master device; the master device may be configured to receive the predetermined pattern and to transmit, in response, a predetermined acknowledgement pattern to initialize communications over the communications path; the master device and the slave device are configured to communicate by adjusting allocation of downlink slots and uplink slots within the frame; the master device and the slave device may be configured to adjust allocation by adjusting a number of turnarounds within the frame; the master device and the slave device may be configured to adjust allocation by adjusting a location of turnarounds within the frame; the master device and the slave device may be configured to communicate by adjusting a position of control bits within the frame; the master device and the slave device may be configured to communicate by adjusting a frequency of the communications path; the master device and the slave device may be configured to communicate by transmitting a command that determines an organization of data within the frame; the master device and the slave device may be configured to communicate by receiving a command indicating a burst configuration for the frame, wherein the burst configuration configures the frame for writing control data when digital data is not present; the master device may be configured to communicate an interrupt by setting an interrupt bit in the frame; and/or the master device is configured to communicate a reset command by setting a predefined potential on the communications path.

The various functionalities described above for a device, whether the master device or the slave device, may be performed in a processor, such as a general central processing unit (CPU), a digital signal processor (DSP), a graphics processing unit (GPU), a modulator/demodulator (modem) chipset, an audio controller, an application-specific integrated circuit (ASIC), logic circuitry, hard-wired processing circuitry, and/or a combination thereof. The communications link for connecting devices may be, for example, a cable with two or more wires containing a differential signaling path. The cable may be used to connect similar or dissimilar devices. For example, the cable may connect two audio devices, two mobile devices, or two mobile entertainment devices. In other examples, the cable may connect an audio device to a microphone, an audio device to a transducer, or a mobile phone to a microphone. In one embodiment, the cable may connect one or more microphones to a media device, wherein the microphones provide information used in an adaptive noise cancellation (ANC) algorithm.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
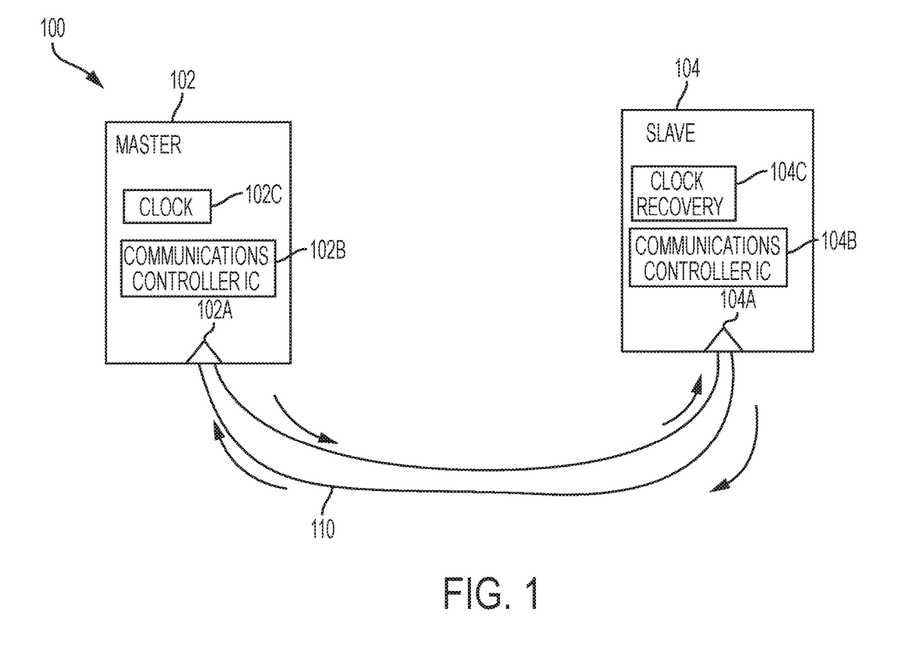
FIG. 1 is a block diagram illustrating two example devices communicating over a differential communications path according to one embodiment of the disclosure.

FIG. 1 is a block diagram illustrating two example devices communicating over a differential communications path according to one embodiment of the disclosure. A cable 110 may provide a communications path between a first (or master) device 102 and a second (or slave) device 104. The cable 110 may include two or more wires (not shown) to support differential signaling for transmission of data between the master device 102 and the slave device 104, and those two wires may be differential positive (DP) and differential negative (DN) lines of a DP/DN signaling path. The two or more wires may provide a communications path, over which a communications protocol executing on the devices 102 and 104 may establish a communications link. The protocol may use the established communications link to coordinate transfer of data between the two devices 102 and 104. Ports 102A and 104A of the devices 102 and 104, respectively, may be configured to receive the cable 110 and establish connections between internal circuitry of the devices 102 and 104 and the two or more wires in the cable 110.

The devices 102 and 104 may also each include a communications controller integrated circuit (IC) 102B and 104B, respectively. The ICs 102B and 104B may execute a communications hardware stack that manages physical layers of communications over the cable 110. For example, the ICs 102B and 104B may receive instructions from a central processing unit (CPU) (not shown) or other processing component of the devices 102 and 104 and generate physical signals, such as differential voltages, to apply to the two or more wires of the cable 110. The CPUs of the devices 102 and 104 may execute a communications software stack for handling logical layer aspects of a communications link. For example, the CPUs may execute steps according to a communications protocol to issue instructions to the ICs 102B and 104B to send particular arrangements of data. The data may be arranged in frames that are assembled at logic layers and sent to the ICs 102B and 104B for transmission on the cable 110. The communications link may be established by the communications protocol by coordinating a handshake process. With the communications link established between the devices 102 and 104, the devices may exchange data in frames, in which the frame configuration may be established and adjusted according to the communications protocol within the logic layers.

Communication over the communications link may be synchronous, such that both devices communicate over the communications link use the same clock signal. The device 102 may include a clock generator 102C that clocks transmission and reception of data over the cable 110. The master device 102 may set a frequency for the clock generator 102C and, in some embodiments, may adjust the frequency during operation of a communications link. The slave device 104 may include clock recovery circuit 104C. The clock recovery circuit 104C may be configured to determine the clock signal from communications over the cable 110. For example, the clock recovery circuit 104C may identify synchronization bits in the transmissions over the cable 110 and recreate the clock signal from the synchronization bits. The recovered clock signal may be used to transmit and receive data over the communications link.

Figure 2:
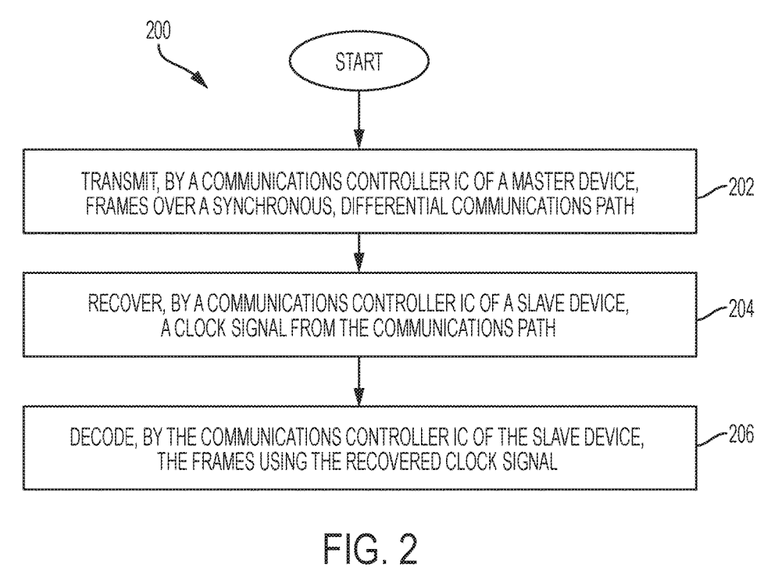
FIG. 2 is a flow chart illustrating an example method of communicating in a system of two devices in a synchronous fashion over a differential communications path according to one embodiment of the disclosure.

An example method of communicating between the devices 102 and 104 is shown in FIG. 2. FIG. 2 is a flow chart illustrating an example method of communicating in a system of two devices in a synchronous fashion over a differential communications path according to one embodiment of the disclosure. A method 200 may begin at block 202 with transmitting, by the master device, frames over a synchronous, differential communications path. A communications link may have been established over the communications path prior to the transmission at block 202 by the master device by performing a link locking procedure after which data frames may be transmitted, as is described in some embodiments below. At block 204, the slave device may recover a clock signal from the frames transmitted over the communications path. Next, at block 206, the slave device may use the recovered clock signal of block 204 to decode the transmitted frames.

Figure 3:
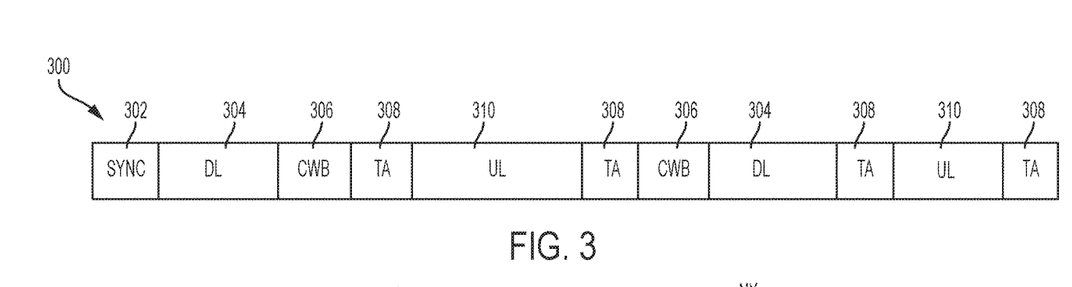
FIG. 3 is a block diagram illustrating an example frame for a communications protocol used on a synchronous, differential communications path according to one embodiment of the disclosure.

One example frame configuration for transmission of data between devices 102 and 104 through a communications link established over the communications path is shown in FIG. 3. FIG. 3 is a block diagram illustrating an example frame for a communications protocol used on a synchronous, differential communications path according to one embodiment of the disclosure. A frame 300 may include a portion 302 having one or more bits used for synchronization. In one embodiment, the portion 302 may be two opposite bits, such as "10" or "01." The transition between signal levels for "1" and "0" occurring at regular intervals, despite other data transmitted between these regular transitions, may be used by the slave device to recover the clock signal used for communications. The frame 300 may also include portions 304 and 310 for transmission of downlink bits (e.g., from master device 102 to slave device 104) and transmission of uplink bits (e.g., from slave device 104 to master device 102), respectively. Between portions 304 and 310 may be a portion 308 during which neither device 102 or 104 transmits to provide time for turnaround between transmissions from the devices 102 and 104. The frame 300 may also include portions 306 for control word bits (CWB) that may be used to indicate a configuration and/or content of the frame 300.

Figure 4:
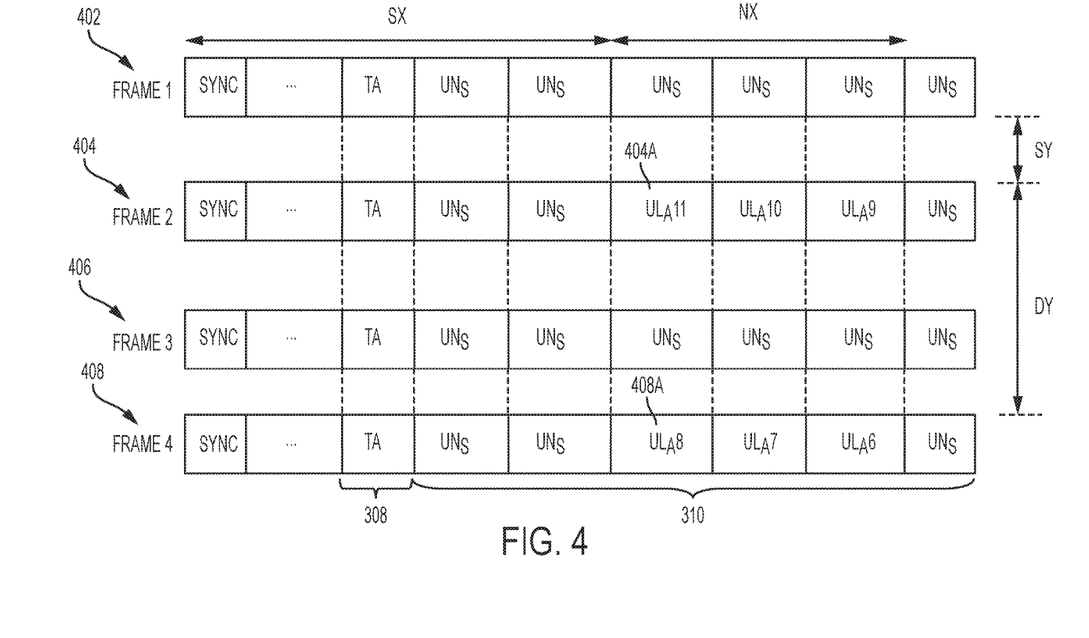
FIG. 4 is a block diagram illustrating an example operation of an adjustable frame configuration for a communications protocol used on a synchronous, differential communications path according to one embodiment of the disclosure.

The frame 300 may be adjusted during operation of the communications link to accommodate data rates, power requirements, and/or other considerations. One such adjustment of the frame structure is illustrated in FIG. 4. FIG. 4 is a block diagram illustrating an example operation of an adjustable frame configuration for a communications protocol used on a synchronous, differential communications path according to one embodiment of the disclosure. A series of frames, which may be a super frame, may include a first frame 402, a second frame 404, a third frame 406, and a fourth frame 408. Portions 308 and 310 of the frame are shown in the frames 402-408. An uplink portion 310 may include a number of bits, some of which may be used to transmit data. When a lower data rate is desired, because there is less data to transmit or to reduce power consumption, some bits of the uplink portion 310 may be unused. The first frame 402 may include unused bits in the portion 310. The second frame 404, offset from the first frame 402 by SY frames, may include NX number of used bits beginning SX bits into the frame 404, at bit 404A. The third frame 406 may include unused bits in the uplink portion 310. The fourth frame 408, separated from the second frame 404 by DY frames (where DY indicates a repetition of frames in time), may include NX used bits beginning SX bits into the frame 408, at bit 408A. The parameters SX, NX, SY, and DY may be adjusted during operation of a communications link to set a data rate. For example, if DY=1, a valid bit slot appears every alternate Frame. If DY=2, a valid bit slot appears once in every three frames. If DY=0, a valid bit slot appears every frame in the super frame.

Flexibility in configuring frames to include data is described above with reference to FIG. 4. However, other aspects of the frames may be configurable. For example, referring back to FIG. 3, the CWB portions 306 may be configured to be placed at different locations throughout the frame 300. In one embodiment, the CWB portion 306 is positioned on either side of turnaround portion 308 to reduce a number of turnarounds. Further, the number of CWB portions 306 may be configured to different numbers than the two illustrated in frame 300. In another example, the TA portions 308 may be adjusted within the frame 300, such as by changing a number of turnaround portions 308 (e.g., two, four, or eight) within a frame 300, by changing a location of the turnarounds (e.g., by changing a number of bits allocated for uplink or downlink transmission), and/or allowing repetition at regular intervals within downlink or uplink portions 304 and/or 310. In yet another example, the clock frequency for the communications link may be adjusted, such as to accommodate power savings or desired bandwidth. Transition between frequencies may be made seamlessly, such that there is no impact on the frequency of the clock reference bit slots except to change a duty cycle, and such that there is no interruption to data flow. Example frequency modes for the communications link are shown below in Table 1:

and bit counts are only examples, and different frame configurations may be supported by the devices 102 and 104. A frame may include 8 bits of master super frame cyclic redundancy code (MSFCRC) data, which is a CRC of all bits driven by the master device in a previous super frame, excluding CWB and SYNC bits. A frame may include 8 bits of slave super frame cyclic redundancy code (SSFCRC) data, which is a CRC of all bits driven by a slave device in a previous super frame, excluding CWB. A frame may include 4 bits of CMD data, which provides information regarding the content of the frame such as link lock, single write, single read, continuous write address, continuous write data, continuous read address, continuous read data, burst write, burst read, or data. A frame may include a bit of even parity of CMD data (EPCMD) data, which is an even parity of the CMD field. A frame may include 24 bits of an address (ADDR) and 24 bits of data (DATA), which may be a byte-addressable register address or data. A frame may include an additional 8 bits of data to be written or read. A frame may include a bit of even parity from master device ($EP_M$) data, which is an even parity of the ADDR/DATA driven by the master device, a bit of even parity from slave device ($EP_S$) data, which is an even parity of DATA driven by the slave device, a bit of data acknowledgement ($ACK_D$) data, which is an active high bit indicating error free receipt of data from a previous super frame, a bit of control word acknowledge ($ACK_{CW}$) data, which is an active high bit indicating error free receipt of CW in a current super frame, and/or a bit of link lock (LOCK) data, which is an active high signal indicating link lock status of the slave device.

An interrupt capability may be provided over the communications path. When a communications link is established and the devices are transmitting frames, the frames may include a bit of interrupt (INT) data, which is an active high interrupt from a slave device, and/or a bit of $INT_B$ data, which is an active low interrupt from slave (for redundancy). The INT and $INT_B$ bits may be used to propagate interrupts periodically through the link without interrupting the data stream. These INT and $INT_B$ bits may be included in each set

TABLE 1

Example communications link configurations.

| Link Clock Frequency | Frame Rate | Super Frame rate | Number of Frames in a Super Frame | Number of bit slots in a Frame | Number of Turn-around bit slots in a Frame | Number of CWB in a Frame | Number of Sync bits in a Frame | Link Efficiency (Excludes Sync0/1, TA & CWB) |
|---|---|---|---|---|---|---|---|---|
| 24.576 Mhz | 384 Khz | 12 Khz | 32 | 64 | 2 | 2 | 2 | 90.625% (58/64) |
| 24.576 Mhz | 384 Khz | 12 Khz | 32 | 64 | 4 | 2 | 2 | 87.5% (56/64) |
| 24.576 Mhz | 384 Khz | 12 Khz | 32 | 64 | 8 | 2 | 2 | 81.25% (52/64) |
| 12.288 Mhz | 384 Khz | 12 Khz | 32 | 32 | 2 | 2 | 2 | 81.25% (26/32) |
| 12.288 Mhz | 384 Khz | 12 Khz | 32 | 32 | 4 | 2 | 2 | 75.0% (24/32) |
| 6.144 Mhz | 384 Khz | 12 Khz | 32 | 16 | 2 | 2 | 2 | 62.5% (10/16) |
| 6.144 Mhz | 384 Khz | 12 Khz | 32 | 16 | 4 | 2 | 2 | 50.0% (8/16) |

Figure 5:
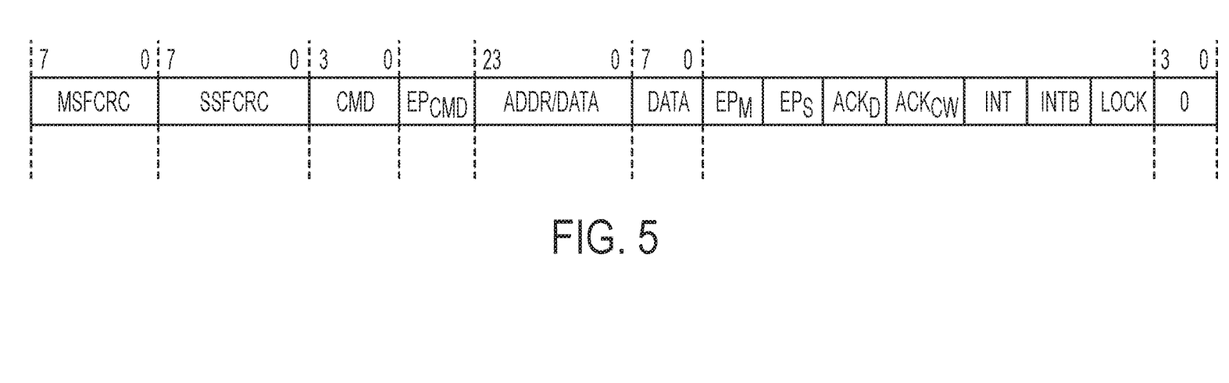
FIG. 5 is a block diagram illustrating example content of a frame for a communications protocol used on a synchronous, differential communications path according to one embodiment of the disclosure.

Content data and control data may be multiplexed in frames. In some embodiments, the content data may be audio data, such as when the slave device 104 is a microphone and the master device 102 is a media device, such as a cell phone. FIG. 5 is a block diagram illustrating example content of a frame for a communications protocol used on a synchronous, differential communications path according to one embodiment of the disclosure. The following content of control word bits (CWB) embedded in the frames. If the communications link has not been established, such as when the link is dormant, an interrupt may be propagated using a predetermined potential on the DP/DN differential communications path other than a potential used for regular symbols or frames.

A reset capability may be provided over the communications path. A communications protocol may allow a reset to be propagated through the communications path to recover a device from an unresponsive state, either when the communications link is active or dormant. The reset may be propagated using a predetermined potential on the DP/DN differential communications path other than a potential used for regular symbols or frames.

Figure 6A:
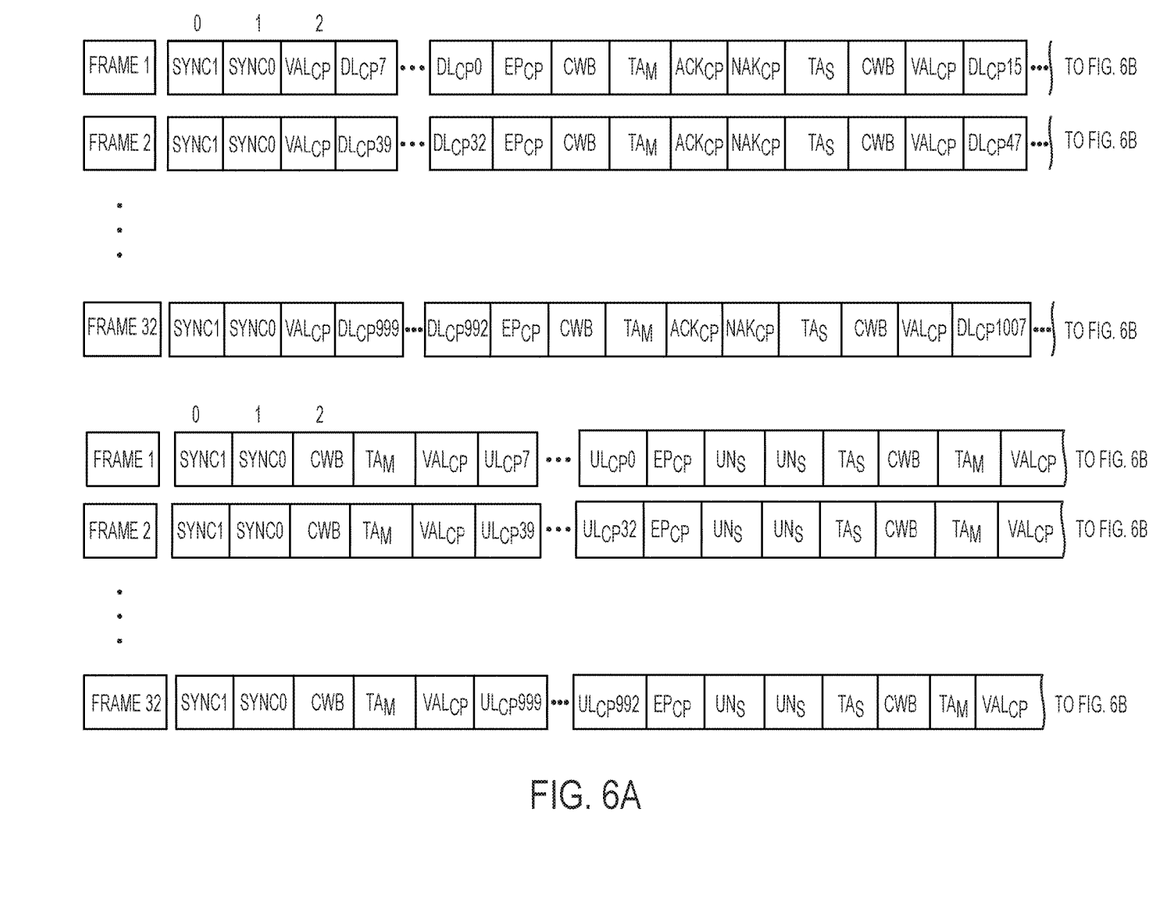
FIGS. 6A-C is a block diagram illustrating an example burst configuration of a frame for a communications protocol used on a synchronous, differential communications path according to one embodiment of the disclosure.
Figure 6B:
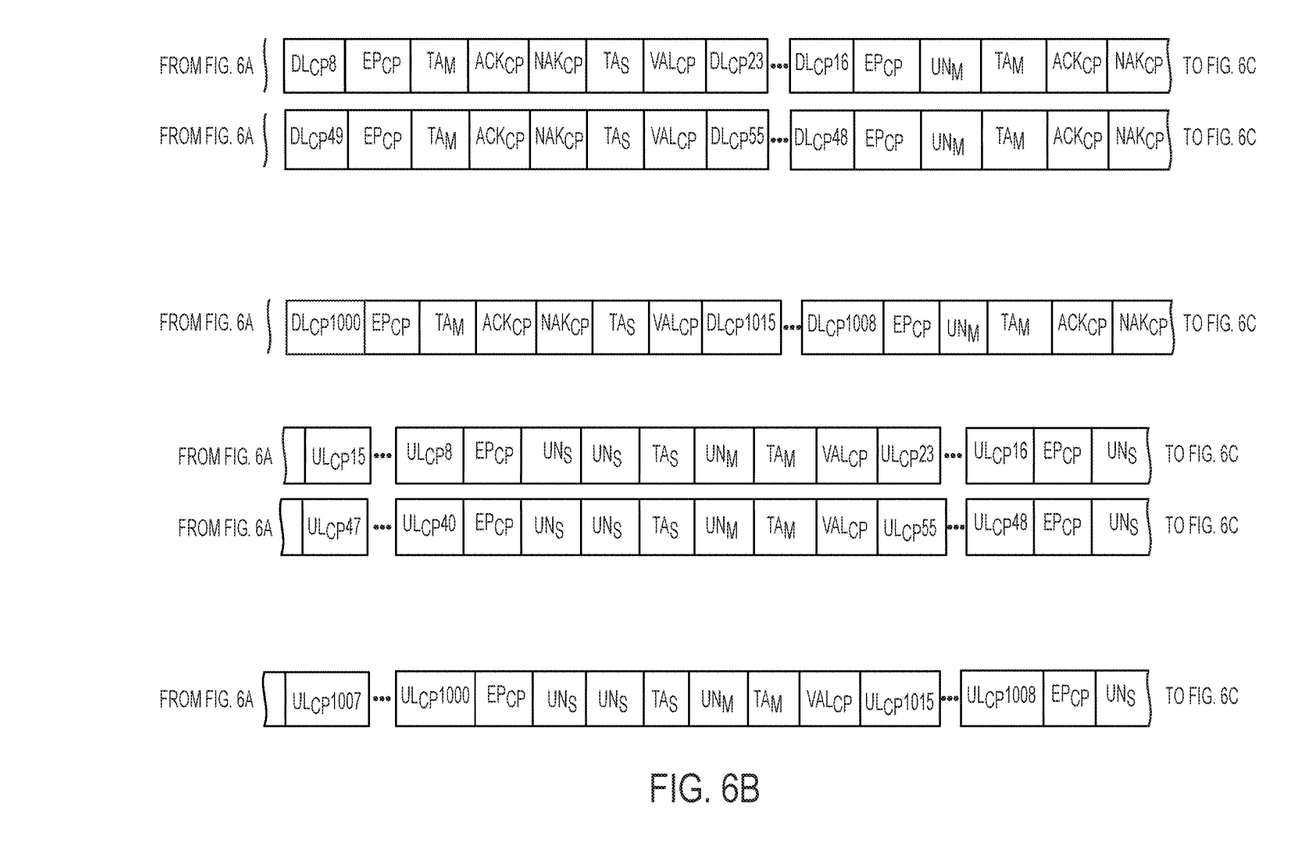
Figure 6C:
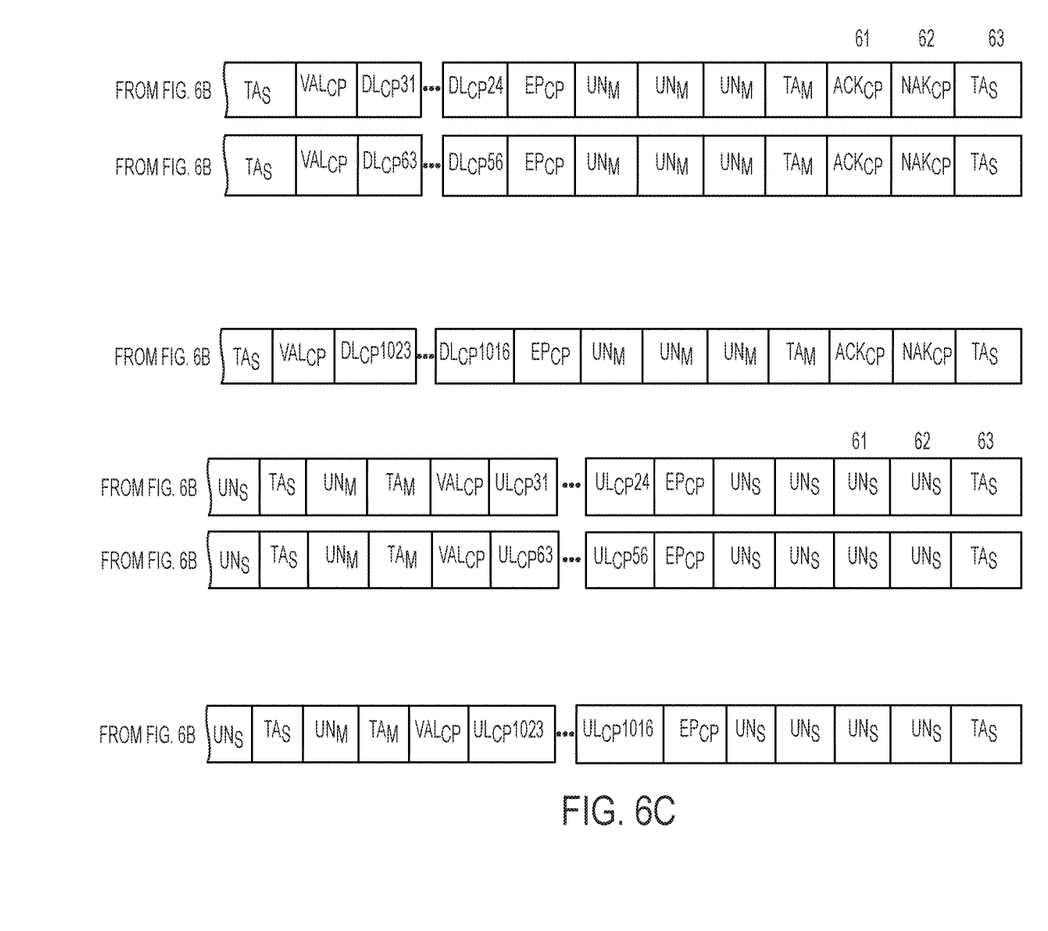

As described above, the frame configuration may be denoted by the CMD data in a frame. The CMD data may indicate a burst write or burst read configuration for the frame. One configuration for a frame for burst read and writes is shown in FIGS. 6A-C. FIGS. 6A-C is a block diagram illustrating an example burst configuration of a frame for a communications protocol used on a synchronous, differential communications path according to one embodiment of the disclosure. The burst configuration may be used to configure one or both devices during startup to reduce configuration time. FIGS. 6A-C shows several super frames, including a first burst super frame that includes only control data bytes, along with a valid bit and even parity bit for each transmitted byte. The address for these data bytes was already communicated in the Previous Super Frame itself, through CWB. In a previous super frame, when it was indicated to a slave device that the following super frame is a burst super frame in the CMD bits, the starting address for burst control writes/reads may be already included in that CWB (through the ADDR bit slots). In the burst super frame, the data bytes start at the indicated ADDR, and the address auto-increments for every subsequent valid data byte. A second super frame shown in FIG. 6 may include data traveling from the slave device to the master device. In FIG. 6, "VALcp" represents a valid bit that indicates the validity of the following byte (e.g., next 8 bit slots), "EPcp" represents an even parity bit that is calculated over the "Val" and "Data" bits to be added for redundancy to let the receiver determine if an error occurs during communication, and "DLcp" represents a data byte (e.g., 8 data bit slots).

Figure 7:
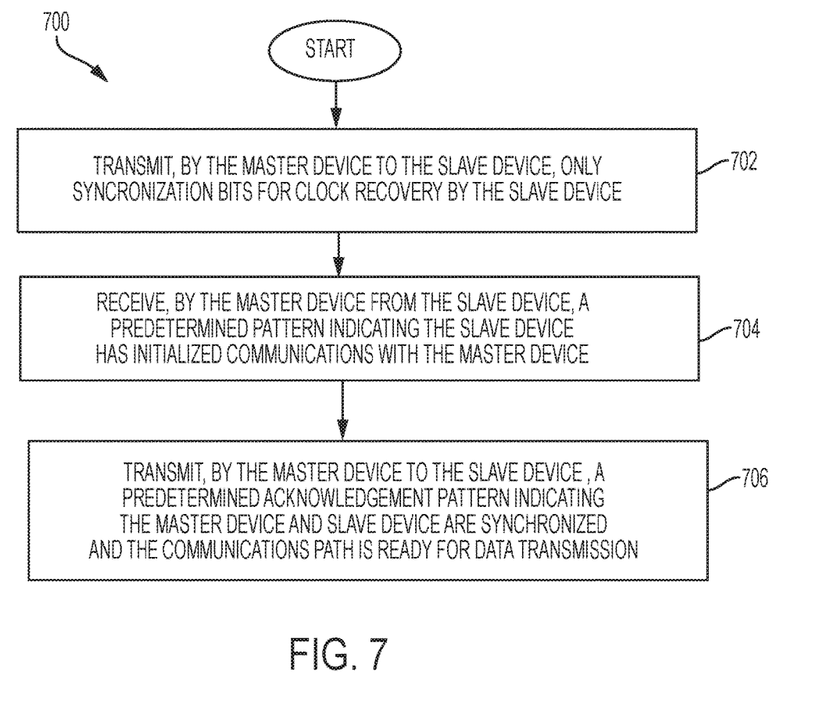
FIG. 7 is a flow chart illustrating an example method of locking a communications link for synchronous, differential communications according to one embodiment of the disclosure.

As described above, the frame configuration may be denoted by the CMD data in a frame. The CMD data may indicate a link lock configuration for the frame. One method for performing link lock is shown in the flow chart of FIG. 7. FIG. 7 is a flow chart illustrating an example method of locking a communications link for synchronous, differential communications according to one embodiment of the disclosure. A method 700 may begin at block 702 with transmitting, by the master device to the slave device, synchronization bits for clock recovery by the slave device. The slave device may identify the periodic signal transition of the synchronization bits and recover the clock signal from the synchronization bits. Although two bits are described for synchronization, larger periodic bit patterns may be transmitted for synchronization in other embodiments. When the slave device identifies the synchronization bits, the slave device may send a predetermined pattern in the frame. Then, at block 704, the master device may receive the predetermined pattern indicating that the slave device is initializing communications with the master device. Then, at block 706, the master device may transmit to the slave device a predetermined acknowledgement pattern indicating the master device and slave device are synchronized. After block 706, a communications link has been established over the communications path, and the devices may exchange data in frames.

Figure 8:
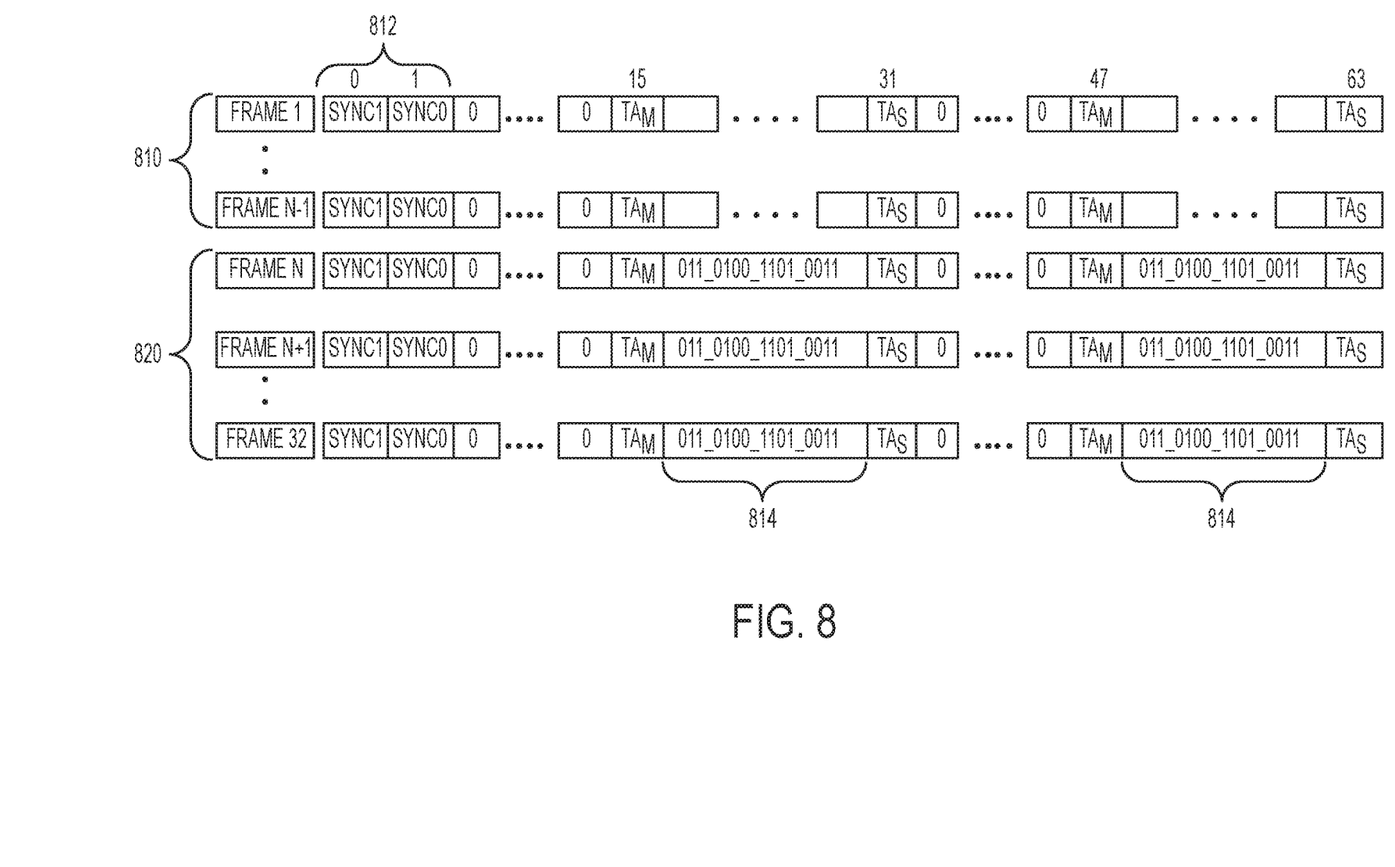
FIG. 8 is a block diagram illustrating an example frame for a first portion of a method for locking a link for synchronous, differential communications according to one embodiment of the disclosure.
Figure 9:
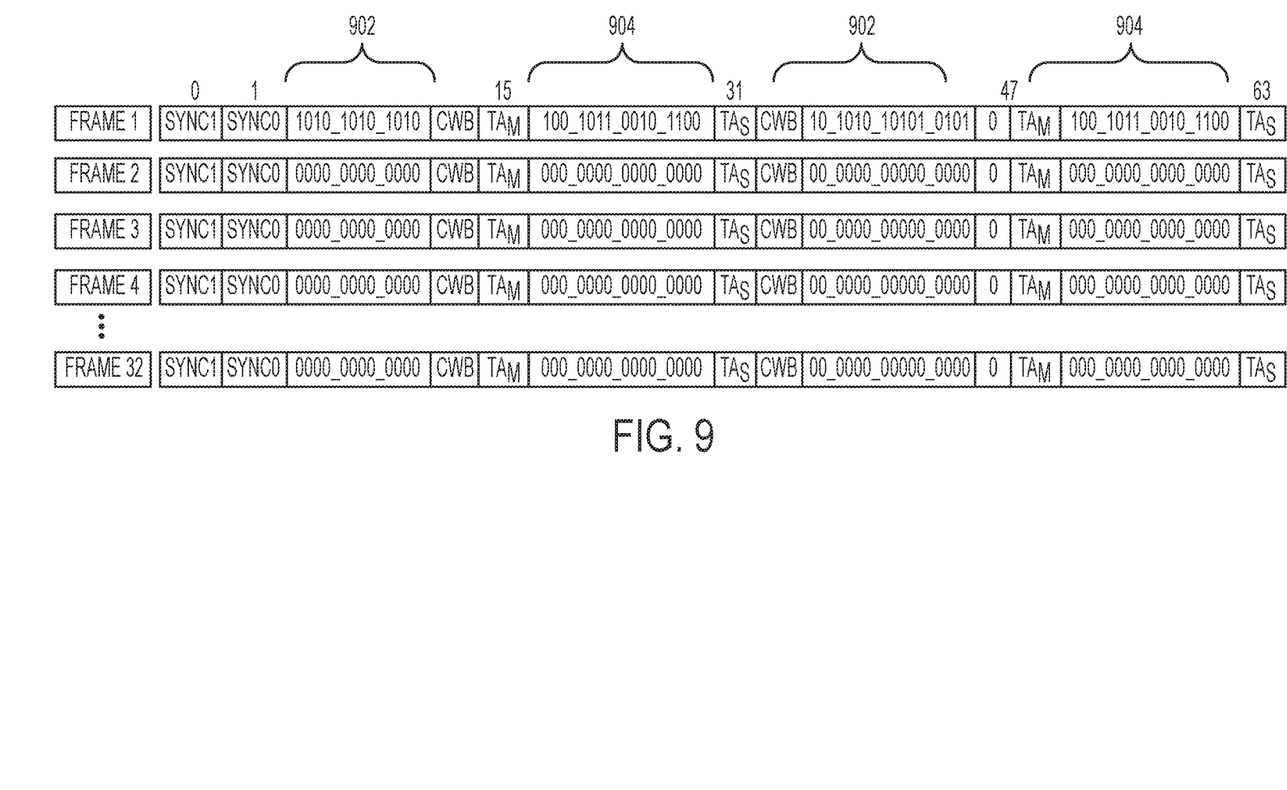
FIG. 9 is a block diagram illustrating an example frame for a second portion of a method for locking a link for synchronous, differential communications according to one embodiment of the disclosure.

One configuration for a frame for link lock is shown in FIG. 8 and FIG. 9, which may be used during the establishing of a communications link as described in FIG. 7. FIG. 8 is a block diagram illustrating an example frame for a first portion of a method for locking a link for synchronous, differential communications according to one embodiment of the disclosure. FIG. 9 is a block diagram illustrating an example frame for a second portion of a method for locking a link for synchronous, differential communications according to one embodiment of the disclosure. For a first number of frames 810, synchronization bits 812 may be transmitted from the master device to the slave device. When the slave device recovers the clock signal, it may begin to transmit a predetermined pattern 814 in frames 820. The master device may detect the predetermined pattern 814 and transmit a predetermined acknowledgement pattern 902. In some embodiments, the slave device may also transmit a predetermined acknowledgement pattern 904. After a predetermined period, the communications link may be established, the acknowledgements may be discontinued, and data transmitted in the frames. After acknowledge is complete, both devices may align their frame counters to a common value.

The schematic flow chart diagrams of FIG. 2 and FIG. 7 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although ones (1s) and zeros (0s) are given as example bit values throughout the description, the function of ones and zeros may be reversed without change in operation of the processor described in embodiments above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method of communicating between a first device and a second device, comprising:
communicating, by the first device with the second device, synchronously over a differential line to transmit data in a series of frames between the first device and the second device by using the same clock signal,
wherein the step of communicating comprises:
transmitting a first frame of the series of frames with a first structure, wherein the first structure comprises a first size, and
transmitting a second frame of the series of frames with a second structure, wherein the second structure comprises a second size, and
wherein the step of communicating comprises adjusting an allocation of downlink slots and uplink slots within frames of the series of frames.

2. The method of claim 1, further comprising recovering, by the first device, a clock signal of the second device, wherein the first device comprises a slave device and the second device comprises a master device.

3. The method of claim 2, wherein the step of recovering the clock signal comprises receiving, by the first device from the second device, synchronizing bits for detecting the clock signal of the second device.

4. The method of claim 3, wherein the step of recovering the clock signal further comprises transmitting, by the first device, a predetermined pattern to the second device; and receiving, by the first device, a predetermined acknowledgment pattern to complete initialization of the connection.

5. The method of claim 1, wherein the step of adjusting allocation comprises adjusting a number of turnarounds within the frames of the series of frames.

6. The method of claim 1, wherein the step of adjusting allocation comprises adjusting a location of turnarounds within the frames of the series of frames.

7. The method of claim 1, wherein the step of communicating comprises adjusting a position of control bits within the frames of the series of frames.

8. The method of claim 1, wherein the step of communicating comprises adjusting a frequency of the clock signal.

9. The method of claim 1, wherein the step of communicating comprises receiving, within a burst configuration frame of the series of frames, a command, wherein the command determines an organization of data within the burst configuration frame.

10. The method of claim 9, wherein the step of communicating comprises receiving a command indicating a burst configuration for the burst configuration frame, wherein the burst configuration configures the burst configuration frame for writing control data when digital data is not present.

11. The method of claim 1, wherein the step of communicating comprises receiving, within control word bits of an interrupt frame of the series of frames, an interrupt bit indicating a received interrupt.

12. The method of claim 1, further comprising detecting, by the first device, a reset command from the second device by detecting a predefined potential on the differential line.

13. An apparatus, comprising:
a first device configured to communicate synchronously with a second device over a differential communications path by transmitting data in a series of frames between the first device and the second device using a same clock signal,
wherein the first device is configured to communicate by:
transmitting a first frame of the series of frames with a first structure, wherein the first structure comprises a first size, and
transmitting a second frame of the series of frames with a second structure, wherein the second structure comprises a second size,
wherein the first device is configured to communicate by adjusting an allocation of downlink slots and uplink slots within frames of the series of frames.

14. The apparatus of claim 13, wherein the first device is configured to recover a clock signal of the second device, wherein the first device comprises a slave device and the second device comprises a master device.

15. The apparatus of claim 14, wherein the first device is configured to receiving synchronizing bits for detecting the clock signal of the second device.

16. The apparatus of claim 15, wherein the first device is configured to transmit a predetermined pattern to the second device, and to receive a predetermined acknowledgment pattern to initialize the communications path.

17. The apparatus of claim 13, wherein the first device is configured to adjust allocation by adjusting a number of turnarounds within the frames of the series of frames.

18. The apparatus of claim 13, wherein the first device is configured to adjust allocation by adjusting a location of turnarounds within the frames of the series of frames.

19. The apparatus of claim 13, wherein the first device is configured to communicate by adjusting a position of control bits within the frames of the series of frames.

20. The apparatus of claim 13, wherein the first device is configured to communicate by adjusting a frequency of the clock signal for the synchronous, differential communications path.

21. The apparatus of claim 13, wherein the first device is configured to communicate by receiving, within a burst configuration frame of the series of frames, a command, wherein the command determines an organization of data within the burst configuration frame.

22. The apparatus of claim 21, wherein the first device is configured to communicate by receiving a command indicating a burst configuration for the burst configuration frame, wherein the burst configuration configures the burst configuration frame for writing control data when digital data is not present.

23. The apparatus of claim 13, wherein the first device is configured to communicate by receiving, within control word bits of an interrupt frame of the series of frames, an interrupt bit indicating a received interrupt.

24. The apparatus of claim 13, wherein the first device is configured to communicate by detecting a reset command from the second device by detecting a predefined potential on the differential line.

25. A system, comprising:
a master device;
a slave device; and
a communications path between the master device and the slave device, wherein the master device and the slave device are configured to communicate using a series of frames transmitted in synchronous, differential signals over the communications path using a same clock signal, and
wherein the master device is configured to communicate the series of frames by:
transmitting a first frame of a series of frames with a first structure, wherein the first structure comprises a first size, and
transmitting a second frame of a series of frames with a second structure, wherein the second structure comprises a second size,
wherein the master device and the slave device are configured to communicate by adjusting an allocation of downlink slots and uplink slots within frames of the series of frames.

26. The system of claim 25, wherein the slave device is configured to recover a clock signal of the master device.

27. The system of claim 26, wherein the master device is configured to transmit synchronizing bits for initializing communications over the communications path, and wherein the slave device is configured to recover the clock signal based, at least in part, on the synchronizing bits.

28. The system of claim 27, wherein the slave device is configured to transmit a predetermined pattern to the master device, wherein the master device is configured to receive the predetermined pattern and to transmit, in response, a predetermined acknowledgement pattern to initialize communications over the communications path.

29. The system of claim 25, wherein the master device and the slave device are configured to adjust allocation by adjusting a number of turnarounds within the frames of the series of frames.

30. The system of claim 25, wherein the master device and the slave device are configured to adjust allocation by adjusting a location of turnarounds within the frames of the series of frames.

31. The system of claim 25, wherein the master device and the slave device are configured to communicate by adjusting a position of control bits within the frames of the series of frames.

32. The system of claim 25, wherein the master device and the slave device are configured to communicate by adjusting a frequency of the communications path.

33. The system of claim 25, wherein the master device and the slave device are configured to communicate by transmitting a command that determines an organization of data within a burst configuration frame of the series of frames.

34. The system of claim 33, wherein the master device and the slave device are configured to communicate by receiving a command indicating a burst configuration for the burst configuration frame of the series of frames, wherein the burst configuration configures the burst configuration frame for writing control data when digital data is not present.

35. The system of claim 25, wherein the master device is configured to communicate an interrupt by setting an interrupt bit in an interrupt frame of the series of frames.

36. The system of claim 25, wherein the master device is configured to communicate a reset command by setting a predefined potential on the communications path.

* * * * *